United States Patent Office 2,773,331
Patented Dec. 11, 1956

2,773,331

HERBICIDAL COMPOSITION AND METHOD

William J. Hughes, Modesto, Calif., assignor to Shell Development Company, New York, N. Y., a corporation of Delaware No Drawing. Application April 1, 1954,
Serial No. 420,465

14 Claims. (Cl. 47—58)

This invention relates to a novel herbicidal composition of matter and to its use as a herbicide. More particularly, the invention pertains to a new composition which is useful for preplanting sterilization of soil, whereby seeds and seedlings of undesired plants can be eradicated from the soil without, however, impairing the usefulness of the soil for subsequent growth of valuable crops.

Soil sterilants of the type containing arsenic are well known. Their effect on the soil, however, is more or less permanent. Consequently, their use generally makes the soil unfit for raising valuable crops at least within any reasonable time. Various organic herbicides are, of course, also well known at the present time. In some cases, they are effective only against germinated plants. Therefore, they are ineffective for the present purposes since they do not prevent germination of seeds already in the soil. In other cases, toxicity towards both seeds and germinated plants has been observed, but rather special field conditions appear to be required in order to realize this toxicity.

It has been proposed to use allyl alcohol as a herbicide, but it has been found to suffer from certain deficiencies in this respect. For example, when allyl alcohol is applied as a solution in water, say at ½% concentration, to the surface of agricultural land or soil which in infested with weed seeds and has been freshly cultivated, germinations as high as 50% or more, based upon the seed count of the untreated soil, may be observed, and this will be true even though the solution is applied at a rate as high as 200 pounds of allyl alcohol per acre. Therefore, even though allyl alcohol has been employed heretofore for use in controlling weeds, it has been not at all satisfactory in connection with such valuable crops as truck produce, tobacco, nursery stocks, and the like, where intensive preplanting cultivation of the soil is practiced.

It now has been unexpectedly discovered in accordance with the present invention that certain agents, when employed together with allyl alcohol, will act conjointly with the allyl alcohol to give a highly effective sterilization of the soil with respect to seeds and seedlings which are present in the soil. Furthermore, the residual herbicidal action of this combination of materials advantageously is of only relatively short duration. As a result, the treated soil, free of feeds and viable seeds, is soon ready for planting of the desired crop either by seeding or by setting out young plants.

The agents which are employed together with allyl alcohol to give the novel compositions and method of this invention are certain low molecular weight unsaturated hydrocarbons containing at least one atom of bromine and having at least one atom of bromine in the allyl posiiton relative to an olefinic bond. Illustrative of these agents are 1-chloro-3-bromo-1-propene, 1,3-dibromopropene, 1-iodo-3-bromo-1-propene, 1-bromo - 3- chloro-2-butene, 1,1-dibromo-2-propene, 1 - chloro - 3- bromo-2-methyl-1-propene, 1-chloro-3,3-dibromo-1 - propene, 1,4-dibromo-2-butene, and 1-chloro-3 - bromo - 2- bromomethyl-1-propene. Although these unsaturated halogen-substitued hydrocarbons may contain 4 carbon atoms those which contain only 3 carbon atoms are preferred. It also is desirable that the unsaturated halogen-substituted hydrocarbon contain both the allylic bromine atom and at least one atom of chlorine, preferably in 1,3 position relative to each other, as in the preferred compound 1-chloro-3-bromo-1-propene. In general, the unsaturated halogen-substituted hydrocarbons which most advantageously are employed conform to the formula

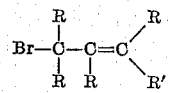

where R' represents halogen, preferably bromine or chlorine, and each R represents hydrogen, halogen, methyl or halomethyl. It is not essential that the individual unsaturated halogen-substituted hydrocarbons be employed in the pure state. For example, mixtures thereof can be used. Even where a single compound is used it ordinarily will be a technical preparation containing minor amounts of closely related halogen-containing organic compounds as typical impurities.

Although the invention is concerned primarily with allyl alcohol, it has been found that certain other low molecular weight unsaturated alcohols exert herbicidal action but that they suffer from the same deficiencies with respect to their action as does allyl alcohol. The low molecular weight halogen-substituted unsaturated hydrocarbons referred to above have been found to co-act similarly with these other closely related unsaturated alcohols. By reason of this co-action, the new compositions and method of the invention are not restricted to allyl alcohols, and in its place there may be employed such other beta, gamma-olefinically unsaturated alcohols containing from 3 to 4 carbon atoms. Such other unsaturated alcohols include the methyl- and/or halogen-substitution products of allyl alcohol, such as methallyl alcohol, gamma-chloroallyl alcohol, crotyl alcohol, delta-chlorocrotyl alcohol, alpha-chloromethylallyl alcohol, gamma-bromoallyl alcohol and delta-bromocrotyl alcohol. Of these, gamma-chloroallyl alcohol and gamma-bromoallyl alcohol warrant particular mention.

For the necessary co-action between the unsaturated halogen-substituted allylic bromide and the beta,gamma-olefinically unsaturated alcohol, the two materials should be present together in a weight ratio of the unsaturated alcohol to the allylic bromide between about 10:1 and about 1:10, although in the preferred compositions the weight ratio of unsaturated alcohol to unsaturated hydrocarbon bromide is between about 1:5 and about 2:1.

The novel compositions of the invention comprise a mutual solution of the low molecular weight unsaturated halogen-substituted hydrocarbon halide and the beta,-gamma-olefinically unsaturated alcohol, containing an inert diluent or solvent if desired, and a surfactant, suitable for suspension or emulsification in water prior to application to the soil. The diluent or solvent, if one is employed, may be any horticulturally suitable water-immiscible diluent, and generally will be a light petroleum distillate, such as one boiling in the kerosene range. As the emulsifying agent or surfactant, there can be employed known emulsifiers, which may be cationic, anionic, or non-ionic, the non-ionic being generally preferred because they are less likely to be adversely affected by the electrolytes of the soil. The amount of emulsifying agent preferably is between about 2% and 10% by weight of the concentrate. Examples of suitable emulsifiers are sodium petroleum sulfonates, mixtures of fatty acid esters of polyethylene glycols, aromatic polyethylene glycol ethers, polyoxyethylene lauryl alcohols, dimeric dialkylphenoxypolyethoxy ethanols, glyceryl phthalic alkyd resins, polymeric condensation products of alkylene groups and aliphatic amides, heptadecyl glyoxalidine salts, etc.

The herbicidal compositions of the invention are generally employed in aqueous emulsions which are sprinkled, sprayed, poured or otherwise applied upon the surface of the ground and allowed to soak into the soil. The emulsions are easily prepared, as in the field or nearby, by mixing the emulsifiable concentrate and water, simple paddle or equivalent stirring devices generally giving adequate stirring. The resulting emulsions, which form a part of my invention, contain the allyl or chemically related alcohol chiefly in the aqueous phase with the unsaturated halohydrocarbon finely dispersed throughout. For most effective results, the emulsion should be applied to freshly prepared seed beds with soil moisture at 50-90% of field capacity of the soil, and if the soil is drier than this it generally should be prewet, preferably at least 12 hours prior to application of the emulsion.

In general, rates of application are of the order of magnitude of from about one-half to about three gallons of the herbicidal concentrate emulsified in water applied to about 100 square yards of soil. The amount of water employed and the amount of unsaturated alcohol present in the herbicidal composition should be so correlated that the concentration of the unsaturated alcohol in the resulting emulsion is not lower than about 0.5% by weight. Emulsions containing from about 0.2% to about 15% by weight or even more of active ingredients are suitable for the purposes of the invention, while a preferred range is from about 0.2% to about 5% by weight of active ingredient.

If desired, the soil can be drenched with water following the application of the herbicidal emulsion. By the use of an afterdrench, the herbicidal effect of the emulsion can be extended to as deep as about one foot or even more.

It is generally desirable to wait for about 7 to about 10 days after application of the herbicidal composition before planting the soil with crops. The present compositions are particularly effective for seed bed treatment, especially seed beds for tobacco, tomatoes, celery and other vegetables, ornamentals, etc.

An example of a typical suitable herbicidal concentrate composition is as follows:

| | Percent weight |
|---|---|
| 1-chloro-3-bromo-1-propene | 38 |
| Allyl alcohol | 57 |
| Emulsifier (polyethylene glycol ether of an alkylphenol, sold under the trade name of "Triton X-155") | 5 |

Further examples of the novel compositions of this invention are as follows:

| | Percent weight |
|---|---|
| 1-chloro-3-bromo-1-propene | 60 |
| Gamma-chloroallyl alcohol | 38 |
| Emulsifier (polyethylene glycol ether of alkylphenol [1]) | 2 |
| 1-chloro-3-bromo-1-propene | 25 |
| Allyl alcohol | 25 |
| Odorless kerosene | 45 |
| Emulsifier (polyoxyethylene lauryl alcohol) | 5 |
| 1-chloro-3-bromo-1-propene | 31 |
| Alpha-methallyl alcohol | 17 |
| Hydrocarbon solvent (odorless kerosene) | 50 |
| Emulsifier (polyethylene glycol ether of alkylphenol [1]) | 2 |
| 1,3-dibromopropene | 60 |
| Allyl alcohol | 38 |
| Emulsifier (polyethylene glycol ether of alkylphenol [1]) | 2 |
| 1-chloro-2,3-dibromo-1-propene | 30 |
| Allyl alcohol | 30 |
| Hydrocarbon solvent (odorless kerosene) | 37 |
| Emulsifier (polyethylene glycol ether of alkylphenol [1]) | 3 |

[1] Triton X-155; Rohm and Haas Company.

Compositions of the invention have been used successfully to rid soil of seedlings and viable seeds where neither the alpha,beta-unsaturated alcohol nor the allyl-type unsaturated bromide applied alone would do so, even at rates of application per unit area more than double the rates at which the respective materials were applied together according to the invention.

For example, in one series of tests there was employed good moist loamy agricultural soil which through cultivation was infested with weed seeds (largely White Dutch clover) on the surface and throughout the first six inches below the surface. In one experiment, an approximately 0.5% solution of allyl alcohol in water was uniformly applied to the surface of the soil at a rate of application equal to 690 pounds of allyl alcohol per acre, followed by a drench with 5000 gallons of water per acre. Germination was measured eight weeks after the application of the allyl alcohol and was found to be approximately 50% based upon the seed count of the soil.

To another portion of the same infested soil there was uniformly applied 700 pounds per acre of 1-chloro-3-bromo-1-propene. The 1-chloro-3-bromo-1-propene was applied as an about 50% solution of technical 1-chloro-3-bromo-1-propene in refined kerosene, emulsified in approximately 5000 gallons of water per pound of the technical 1-chloro-3-bromo-1-propene. The application was followed by a drench with water uniformly applied at the rate of 5000 gallons per acre. Germination counts showed approximately 30% germination based upon the seed count of the untreated soil.

To a third portion of the same infested soil there was applied an emulsion that had been prepared by mixing about 4 parts by weight of technical 1-chloro-3-bromo-1-propene and about 1 part by weight of allyl alcohol, and emulsifying the mixture in 9.6 gallons of water per pound of the mixture with the aid of a non-ionic emulsifying agent (Triton X-155). The emulsion was uniformly applied to the soil at the rate of approximately 4800 gallons per acre (equal to approximately 100 pounds of allyl alcohol per acre and approximately 400 pounds of technical 1-chloro-3-bromo-1-propene per acre). Germination of the seeds was completely prevented.

It will be observed that the total rate of application of the technical 1-chloro-3-bromo-1-propene and allyl alcohol applied together was less than the individual rates of application in the two preceding experiments. The markedly superior results which were obtained illustrate the novel co-action upon which the invention is in part based. Tests utilizing, instead of allyl alcohol, other low molecular weight alpha,beta-unsaturated alcohols, such as alpha-methallyl alcohol and beta-chloroallyl alcohol, have shown them and allyl-type unsaturated bromides referred to hereinbefore to be similarly co-active.

The invention is applicable generally to eradication of viable seeds from soil and is not to be construed as being limited to the specific embodiment described above. For each particular application in the field, it may be desirable, of course, to vary somewhat the rates of application from those shown, according to the type of soil, the varieties of seeds present, and the condition of the soil at the time of application.

I claim as my invention:

1. A herbicidal composition comprising allyl alcohol and 1-chloro-3-bromo-1-propene, the weight ratio of allyl alcohol to 1-chloro-3-bromo-1-propene being from about 10:1 to about 1:10.

2. A herbicidal composition comprising a beta,gamma-olefinically unsaturated alcohol of 3 carbon atoms and halogen-substituted allyl bromide, the weight ratio of said alcohol to said bromide being from about 10:1 to about 1:10.

3. A herbicidal composition comprising a beta,gamma-olefinically unsaturated aliphatic monohydric alcohol of from 3 to 4 carbon atoms and a halogen poly-substituted alkene of from 3 to 4 carbon atoms having an allylic bromine atom, the weight ratio of said alcohol to said alkene being from about 10:1 to about 1:10.

4. A herbicidal concentrate composition comprising allyl alcohol and 1-chloro-3-bromo-1-propene, the weight ratio of allyl alcohol to 1-chloro-3-bromo-1-propene being from about 1:5 to about 2:1, and an emulsifying agent suitable for dispersing the composition in water.

5. A herbicidal concentrate composition comprising a beta,gamma-olefinically unsaturated alcohol of from 3 to 4 carbon atoms and a halogen-disubstituted alkene of from 3 to 4 carbon atoms having an allylic bromine atom, the weight ratio of said alcohol to said alkene being from about 10:1 to about 1:10, and an emulsifying agent suitable for dispersing the composition in water.

6. An emulsion prepared by dispersing the composition of claim 5 in water.

7. A herbicidal concentrate composition comprising allyl alcohol, 1-chloro-3-bromo-1-propene, the weight ratio of said allyl alcohol to said 1-chloro-3-bromo-1-propene being from about 1:5 to about 2:1, and a non-ionic emulsifying agent in an amount conducive to formation of a stable aqueous emulsion.

8. An emulsion prepared by dispersing the composition of claim 7 in water.

9. A herbicidal concentrate composition comprising allyl alcohol, 1-chloro-3-bromo-1-propene, the weight ratio of said allyl alcohol to said 1-chloro-3-bromo-1-propene being from about 1:5 to about 2:1, a liquid hydrocarbon solvent therefor, and an emulsifying agent in an amount conducive to formation of a stable emulsion in water.

10. An emulsion prepared by dispersing the composition of claim 9 in water.

11. A method of ridding soil of viable seeds which comprises applying to soil containing such viable seeds an effective amount of a composition comprising allyl alcohol and 1-chloro-3-bromo-1-propene having a weight ratio of allyl alcohol to 1-chloro-3-bromo-1-propene of from about 1:5 to about 2:1.

12. A method for preplanting benefaction of agricultural soil which comprises applying to said soil a herbicidally effective amount of a composition comprising a beta,gamma-olefinically unsaturated alcohol having from 3 to 4 carbon atoms and a halogen-substituted allyl bromide in a weight ratio of said alcohol to said bromide of from about 10:1 to about 1:10.

13. A method of controlling weeds which comprises applying to the soil a herbicidally effective amount of a composition comprising a beta,gamma-olefinically unsaturated alcohol of 3 carbon atoms and halogen-substituted allyl bromide, the weight ratio of said alcohol to said allyl bromide being from about 1:3 to about 3:1.

14. The method of planting a crop in seed beds contaminated by weed seeds which comprises prewetting the soil of said beds with water to obtain a soil moisture of 50-90% of field capacity of the soil, applying to said soil, not less than about 12 hours after said prewetting, a herbicidally effective amount of an aqueous emulsion comprising allyl alcohol and 1-chloro-3-bromo-1-propene having a weight ratio of allyl alcohol to 1-chloro-3-bromo-1-propene of from about 1:5 to about 2:1 and an emulsifying agent in an amount conducive to the formation of a stable emulsion in water and planting the desired crop in the treated seed beds not less than about seven days thereafter.

References Cited in the file of this patent

UNITED STATES PATENTS

| | | |
|---|---|---|
| 2,415,251 | Leavitt | Feb. 4, 1947 |
| 2,435,204 | Davidson | Feb. 3, 1948 |
| 2,449,286 | Fairbairn | Sept. 14, 1948 |
| 2,586,793 | Doty et al. | Feb. 26, 1952 |

FOREIGN PATENTS

| | | |
|---|---|---|
| 140,241 | Australia | Feb. 15, 1951 |

OTHER REFERENCES

De France et al.: Chemical Abstracts, vol. 39 (1947), col. 6010(e).

Kirrmann et al.: Bull. Soc. Chim. de France, Jan.-Feb. 1948, pages 167-168.

Maki et al.: Chemical Abstracts, vol. 46 (1952), col. 7273(g).